United States Patent [19]

Reilly et al.

[11] Patent Number: 4,910,951

[45] Date of Patent: Mar. 27, 1990

[54] WINDROW MERGER

[75] Inventors: Paul O. Reilly; Donald E. Burrough, both of West Bend, Wis.

[73] Assignee: Gehl Company, West Bend, Wis.

[21] Appl. No.: 162,566

[22] Filed: Mar. 1, 1988

[51] Int. Cl.[4] ............................................. A01D 89/00
[52] U.S. Cl. ...................................... 56/376; 56/370
[58] Field of Search ............... 56/370, 377, 11.9, 190, 56/376

[56] References Cited

U.S. PATENT DOCUMENTS

| | | |
|---|---|---|
| 1,166,136 | 12/1915 | Leasure. |
| 2,168,266 | 8/1939 | McElwain. |
| 2,502,599 | 4/1950 | Smart. |
| 2,529,422 | 11/1950 | Sampson. |
| 2,529,577 | 11/1950 | Schempp et al.. |
| 2,609,651 | 9/1952 | Cymara. |
| 2,636,335 | 4/1953 | Whitney ............................. 56/370 |
| 2,667,731 | 2/1954 | Nerness. |
| 2,679,720 | 6/1954 | Cymara. |
| 2,695,487 | 11/1954 | Glienke. |
| 2,727,350 | 12/1955 | Kuhlman ............................. 56/370 |
| 2,735,533 | 2/1956 | Collins et al.. |
| 2,741,892 | 4/1956 | Collette. |
| 2,761,270 | 9/1956 | Blaser et al.. |
| 3,613,336 | 10/1971 | Smith ................................. 56/11.9 |
| 3,716,973 | 2/1973 | Kidd .................................. 56/372 |
| 3,885,375 | 5/1975 | Solterbeck ......................... 56/11.9 |
| 4,463,546 | 8/1984 | Day .................................. 56/190 |
| 4,703,612 | 11/1987 | Webster ............................. 56/11.9 |
| 4,738,092 | 4/1988 | Jennings ............................. 56/370 |

OTHER PUBLICATIONS

Catalog Entitled "Gehl Farm Catalog" Published and Distribute by Gehl Company of West Bend, Wisc. during 1987.
Leaflet entitled "The New Rowse Conveying Hay Rake" Published and Distributed by Rowse Hydraulic Rakes Company, Inc. of Burwell, Neb.
Article Entitled "New Way to Make Top Quality Hay", p. 16 of Farm Show Magazine.
P. 11 of an Article of 9-1985 Edition of Farm Industry News.

Primary Examiner—Paul J. Hirsch
Attorney, Agent, or Firm—Andrus, Sceales, Starke & Sawall

[57] ABSTRACT

An apparatus for merging a pair of windows into a single window for subsequent processing by a forage harvester, square baler or the like. The apparatus includes a main frame, a rotary pickup head for picking up the first windrow, a cross conveyor mounted on the main frame and disposed rearwardly of the pickup head for transporting the first windrow transversely between a windrow receiving end and a windrow discharge end, a hydraulic drive circuit including a cross conveyor drive motor and a pickup drive motor, a speed control mechanism for controlling the speed of the cross conveyor independently of the speed of the pickup head so that conveyor belt speed may be adjusted depending upon the distances between windrows to either discharge or throw the first windrow a further distance or a shorter distance so as to be combined with a second adjacent windrow. There is also disclosed a quick attachment assembly for pivotally and releasably attaching the main frame to a tractor.

20 Claims, 5 Drawing Sheets

WINDROW MERGER

BACKGROUND OF THE INVENTION

The present invention relates to harvesting, and more particularly to an apparatus for merging a pair of windows into a single windrow for subsequent processing by a forage harvester, square baler or the like.

Recently, high capacity forage harvesters have been developed which, in order to harvest at top capacity so as to improve harvesting efficiency, requires an increase in ground speed. This extra speed creates wear and tear on the tractor, harvester, forage box, running gear and the operator. Thus, it would be desirable to provide an apparatus which would allow top capacity harvesting by combining two windows into one during harvesting while at the same time allowing reduced ground speed.

Although raking attachments have been utilized in the past to combine two windrows, raking has several disadvantages. First, raking requires a separate pass around a field in a tractor prior to harvesting and therefore requires more energy and more time. Secondly, raking typically knocks off leaves of crops such as alfalfa thus reducing the nutritional value of the crop. Finally, raking is undesirable since raking attachments not only pickup the windrow but also pickup stones and rocks and mixes them with the windrow with the result that damage occurs to harvester knives.

Various other apparatus are known for moving, turning and fluffing one windrow or creating one windrow from cut material. The following United States patents show examples of such apparatus:

| Patent No. | Inventor | Issue Date |
|---|---|---|
| 1,166,136 | Leasure | Dec. 28, 1915 |
| 2,168,266 | McElwain | Aug. 1, 1939 |
| 2,502,599 | Smart | April 4, 1950 |
| 2,529,422 | Sampson | Nov. 7, 1950 |
| 2,529,577 | Schempp et al | Nov. 14, 1950 |
| 2,609,651 | Cymara | Sept. 9, 1952 |
| 2,667,731 | Nerness | Feb. 2, 1954 |
| 2,679,720 | Cymara | June 1, 1954 |
| 2,695,487 | Glienke | Nov. 30, 1954 |
| 2,727,350 | Kuhlman | Dec. 20, 1955 |
| 2,735,533 | Collins et al | Feb. 21, 1956 |
| 2,741,892 | Collette | April 17, 1956 |
| 2,761,270 | Blaser et al | Sept. 4, 1956 |

SUMMARY OF THE INVENTION

An apparatus for merging a pair of windrows into a single windrow for subsequent processing by a forage harvester, square baler or the like. The apparatus includes a main frame having forward and rearward ends, pickup means at the forward end of the frame for picking up a first windrow and moving the first windrow rearwardly thereof, cross conveyor means mounted on the main frame and disposed rearwardly of the pickup means for transporting the first windrow transversely between a windrow receiving end and a windrow discharge end, drive means for driving the cross conveyor means and the pickup means at predetermined speeds, speed control means for controlling the speed of the cross conveyor independently of the speed of the pickup means, and attachment means for pivotally and releasably attaching the main frame to the front of a tractor.

The drive means preferably comprises a hydraulic drive circuit including a hydraulic pickup drive motor, a hydraulic belt drive motor downstream of the pickup drive motor, a source of hydraulic pressure, an input line leading from the source to the pickup drive motor, an output line from the pickup drive motor to the belt drive motor, a return line from the belt drive motor to the source, and flow control means in the input line upstream of the pickup drive motor for setting the flow of hydraulic fluid to the pickup drive motor from the source at a desired rate. The flow control means preferably comprises a priority divider valve having an inlet port communicating with the source and first and second outlet ports, the first outlet port communicating with the pickup drive motor, and a selector valve having an inlet port communicating with the second outlet port of the priority valve, an outlet port communicating with the return line, and a two position selector valve spool element that in its open position allows the priority divider valve to bypass excess hydraulic fluid on open center hydraulic systems and in its closed position negates the function of the priority divider valve on closed center tractor hydraulic systems.

The speed control means preferably comprises a belt drive motor bypass circuit which includes a bypass line communicating between the output line upstream of the belt drive motor and the return line downstream of the belt drive motor, and a variable adjustable orifice member disposed in the bypass line for regulating the flow of hydraulic fluid therethrough.

In another aspect of the invention, the attachment means includes a pivot tube extending transversely across the main frame and disposed rearwardly of the conveyor means, bracket means mounted on the tractor including a tube-receiving portion, lock means for locking the tube within the tube-receiving portion permitting pivotal movement of the tube relative to the bracket means, and lift means for pivotally moving the main frame relative to the bracket means to raise and lower the main frame. Preferably, the tube-receiving portion comprises a yoke member which includes opposite legs that straddle the pivot tube, and the lock means comprises a pin extending between the legs of the yoke member. The lift means preferably comprises a hydraulic cylinder extending between the bracket means and one of a pair of transversely adjustable arm assemblies. Additionally, a counter-balance means for biasing the main frame toward its raised position is also provided. The counterbalance means may comprise at least one coil spring extending between one of the transversely adjustable arm assemblies and the bracket means.

In still another aspect of the invention, the apparatus includes a shroud mounted on the main frame rearwardly of the conveyor means and extending upwardly and forwardly over the conveyor means which is open at its forward end and at the discharge end of the conveyor means and closed at the receiving end of the conveyor means. The shroud may also include a transparent window therein to provide a view of the incoming windrow and helps improve tractor positioning to ensure that a tractor operator is picking up the entire windrow. A windrow holddown assembly is also mounted on the forward end of the shroud for holding the windrow against the pickup head. The holddown assembly includes a plurality of transversely spaced arcuate shaped tines pivotally mounted on the shroud between an upper storage position and a lower guide position. The pivotal connection of the tines is provided by a rod pivotally mounted at its opposite ends to a pair of holddown supports depending from the forward end of the shroud.

The present invention thus eliminates the problem of increasing ground speed in order to harvest at top capacity. The present invention allows top capacity harvesting by combining two windrows as a crop is harvested. Additionally, half as many passes around a field is required in order to harvest which thus allows an operator to slow down and perform the harvesting operation more efficiently and in less time. Fuel savings are substantial because only half as many passes are made, and the reduced ground speed allows a tractor to run more efficiently. The apparatus of the present invention is quickly mountable and demountable on the front of tractors, and improves overall harvesting efficiency by merging two windrows into one fluffy double windrow. This thicker crop mat feeding into the harvester will improve the uniformity of cut and increase capacity so as to provide the improved overall harvesting efficiency.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
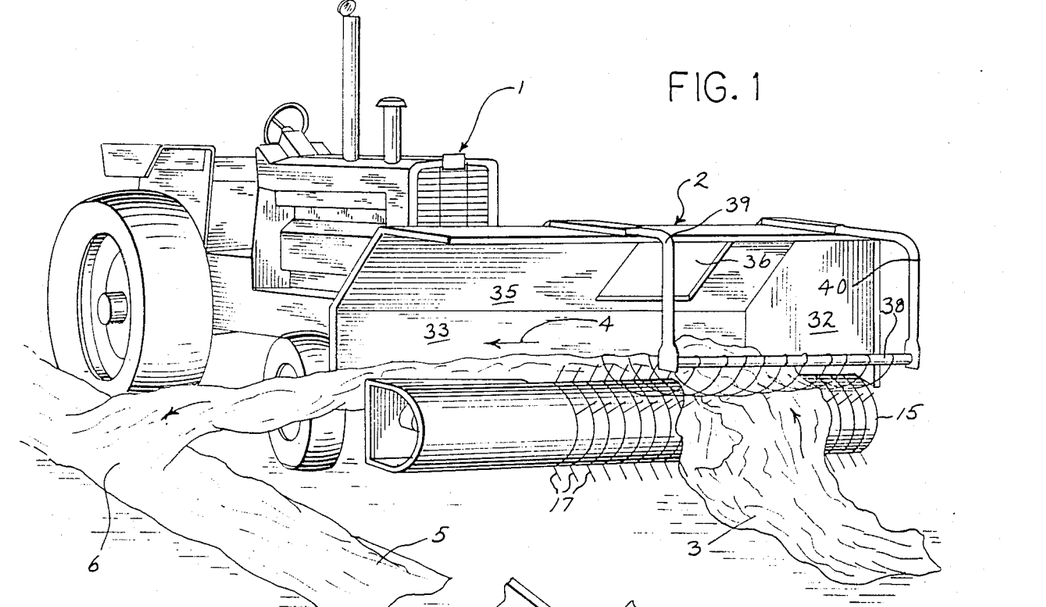
FIG. 1 is a perspective front view of a windrow merger in accordance with the present invention.

Referring now to the drawings, FIG. 1 illustrates a tractor 1 having a windrow merger 2 constructed in accordance with the present invention attached at its front end for movement forwardly through a field of cut and windrowed crop such as alfalfa. As illustrated, a first windrow 3 is picked up by the windrow merger 2 and transported or carried crosswise or transversely to the longitudinal direction of windrow 3, as illustrated by arrow 4, and discharged into a second windrow 5 that extends substantially parallel to windrow 3. Windrow merger 2 thus forms a double windrow 6 having a thicker crop mat for subsequent processing, as by being fed into a forage harvester (not shown) and then into a forage box (not shown) or double windrow 6 may be fed into a square baler (not shown) or the like. Such devices are typically pulled behind tractor 1 in line with double windrow 6. Therefore, no repositioning of such apparatus would be required in order to utilize windrow merger 2.

Figure 2:
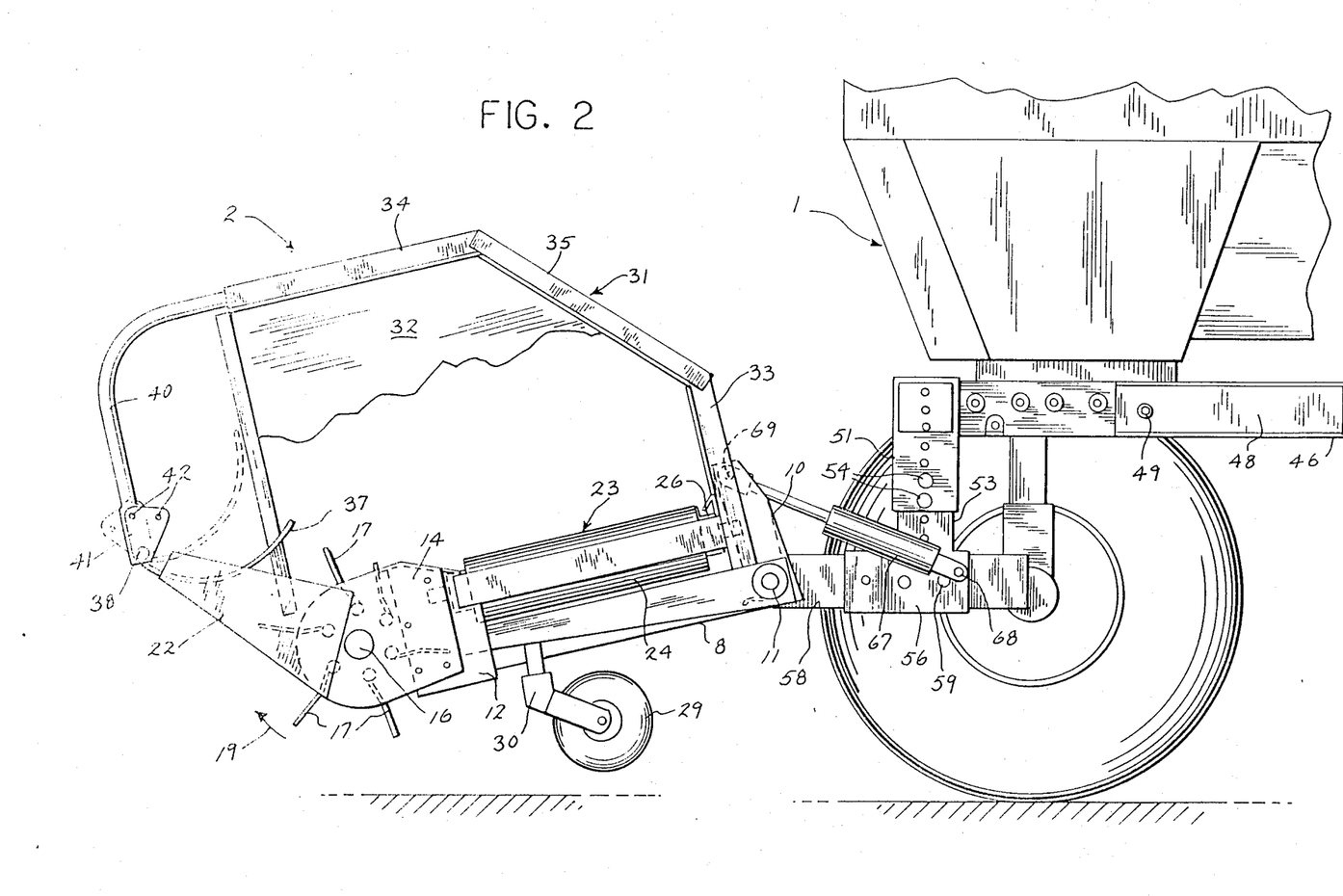
FIG. 2 is a side view in elevation taken along the plane of the line 2—2 in FIG. 3 of the windrow merger.
Figure 3:
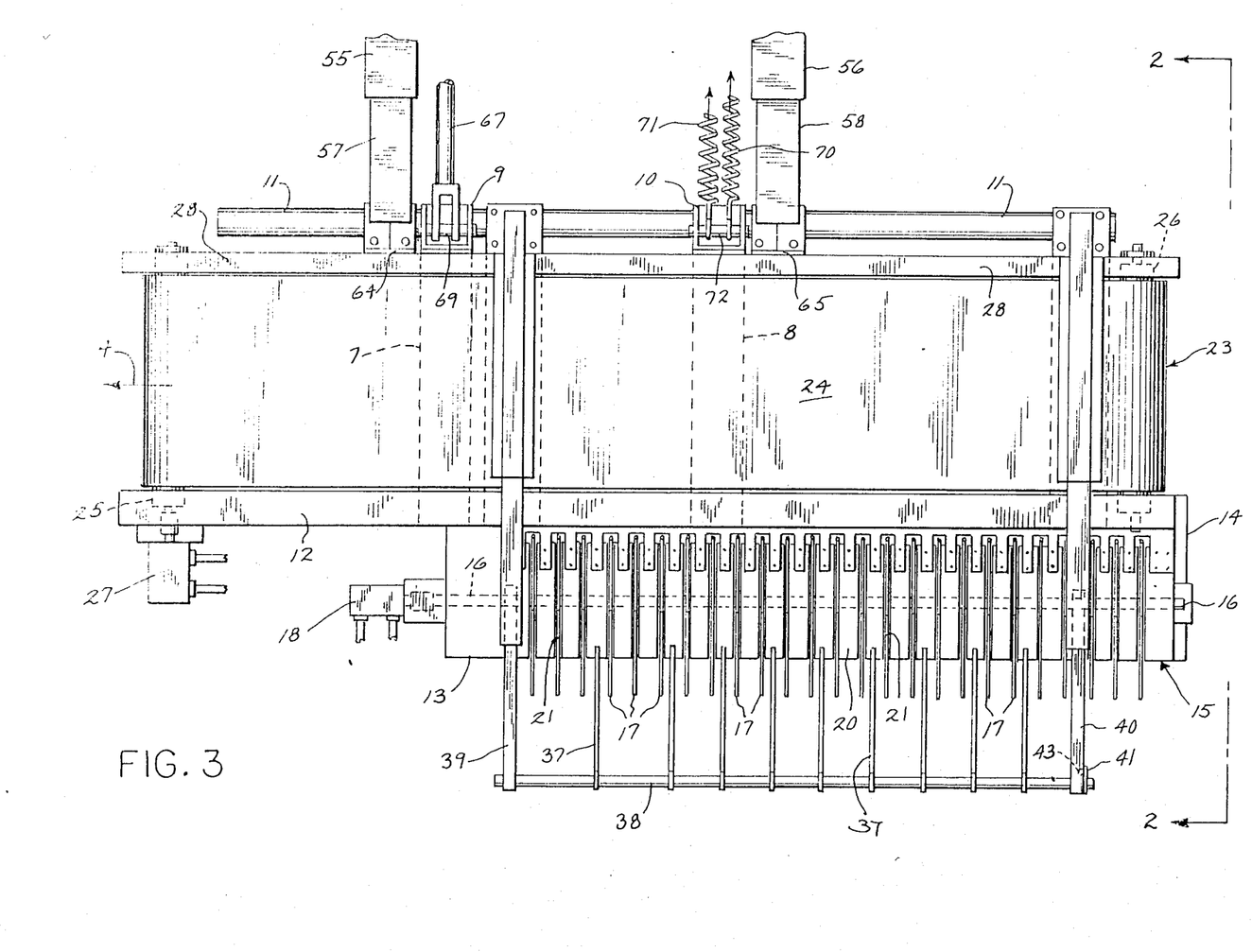
FIG. 3 is a top plan view of the windrow merger of FIG. 1.

Referring now more specifically to FIGS. 2 and 3, windrow merger 2 includes a main frame having a forward or leading end and a rearward or trailing end. The main frame includes a pair of laterally spaced forwardly projecting arm assemblies 7, 8 each including an upstanding channel shaped support member 9, 10 respectively at its rearward end, as shown best in FIG. 4. Arm assemblies 7, 8 are supported at their rearward ends by a pivot tube 11. Arm assemblies 7, 8 are contained at their forward ends by a cross beam 12 which in turn supports a pair of stanchion plates 13, 14 projecting forwardly thereof. The two arm assemblies can be slid along the longitudinal axis of pivot tube 11 to accommodate variances in tractor frame widths on the different tractor makes and models.

A crop pickup head 15 is located at the forward end of the main frame for picking up first windrow 3 and moving first windrow 3 rearwardly thereof as tractor 1 moves forwardly. Pickup head 15 may be of any suitable form, but preferably and as shown, it is in the nature of a rotary shaft 16 extending transversely of windrow 3, and equipped with a plurality of axially spaced radially outwardly projecting pickup fingers 17 mounted on shaft 16 for rotation therewith. Shaft 16 is journalled at its opposite ends in stanchion plates 13, 14, and is driven by a hydraulic pickup drive motor 18 direct coupled to rotary shaft 16. As shown in FIG. 2, motor 18 drives shaft 16 and pickup fingers 17 clockwise in the direction of arrow 19 to pickup windrow 3. As shown best in FIG. 3, pickup head 15 includes a cylindrical shaped finger guide housing 20 having a plurality of substantially annular slots 21 formed therein which are aligned with pickup fingers 17 in order to guide fingers 17 during their rotational movement, as is conventional. As shown best in Fig. 2, a crop guide plate 22 may also be connected to stanchion plate 14 which projects forwardly therefrom. Guide plate 22 prevents the crop from hanging up on the front left corner when the crop extends beyond the left end of merger 2.

A cross conveyor 23 is also mounted on the main frame, and is disposed rearwardly of pickup head 15. Cross conveyor 23 functions to receive the material of first windrow 3 from pickup head 15 and transport this material transversely between its receiving end and its discharge end. Cross conveyor 23 is in the form of an endless belt 24 trained about a driven roller 25 and an idler roller 26. Belt 24 and roller 25 are driven by a hydraulic belt drive motor 27 direct coupled to the shaft of driven roller 25. Rollers 25, 26 are both journalled at their opposite ends between cross beam 12 and an upstanding flange member 28 supported by the main frame and extending crosswise thereof substantially parallel to beam 12. The speed of belt 24 may be controlled independently of the speed of pickup head 15, as will hereinafter be described, so that windrow merger 1 is adaptable to different windrow center distances by adjusting the belt speed to either discharge windrow 1 a further distance or a shorter distance onto windrow 2, as desired.

Windrow merger 2 is supported on the ground by a pair of laterally spaced wheels 29 (only one of which is shown in FIG. 2) mounted to the main frame. Wheels 29 are mounted to the main frame by means of struts 30.

As shown best in FIGS. 1 and 2, windrow merger 2 also includes a shroud 31 mounted on the main frame rearwardly of conveyor 23 so as to extend upwardly and forwardly over conveyor 23. Shroud 31 functions to prevent dust and crop material from getting into the radiator of tractor 1, and during windy days, to aid in preventing loss of crop material as it is picked up by pickup head 15 and moved rearwardly onto cross conveyor 23. As seen best in FIG. 1, shroud 31 is open at its forward end and at the discharge end of cross conveyor 23 but is closed by side panel 32 at the receiving end of cross conveyor 23. Shroud 31 includes a vertical deflector 33 disposed rearwardly of conveyor 23, a horizontal deflector 34 disposed above conveyor 23, and an angle deflector 35 interconnecting the vertical deflector 33 and horizontal deflector 34. As shown best in FIG. 1, deflectors 33-35 extend transversely across the entire width of windrow merger 2. A transparent window 36 is also located in angle deflector 35 at the receiving end of conveyor 23. Window 36 provides a view of the incoming windrow 3 and helps an operator improve tractor positioning so that the operator is assured of picking up the entire windrow 3.

A windrow holddown assembly is mounted on the forward end of shroud 31 for holding windrow 3 against pickup head 15. The holddown assembly includes a plurality of transversely spaced arcuate shaped tines 37 pivotally mounted on shroud 31 between an upper storage position (shown in dashed lines in FIG. 2) and a lower guide position (shown in solid lines in FIG. 2). The pivotal connection of tines 37 is provided by a rod 38 pivotally mounted at its opposite ends to a pair of holddown supports 39, 40. Holddown supports 39, 40 each include an upper leg affixed to horizontal deflector 34 and a lower leg depending from deflector 34 forwardly of pickup head 15. As shown best in Fig. 2, one end of rod 38 is connected to a detent plate 41 having projections 42 thereon which may be received within a detent opening 43 in the lower end of holddown support 40 for holding tines 37 in either their upper storage position or lower guide position.

Figure 4:
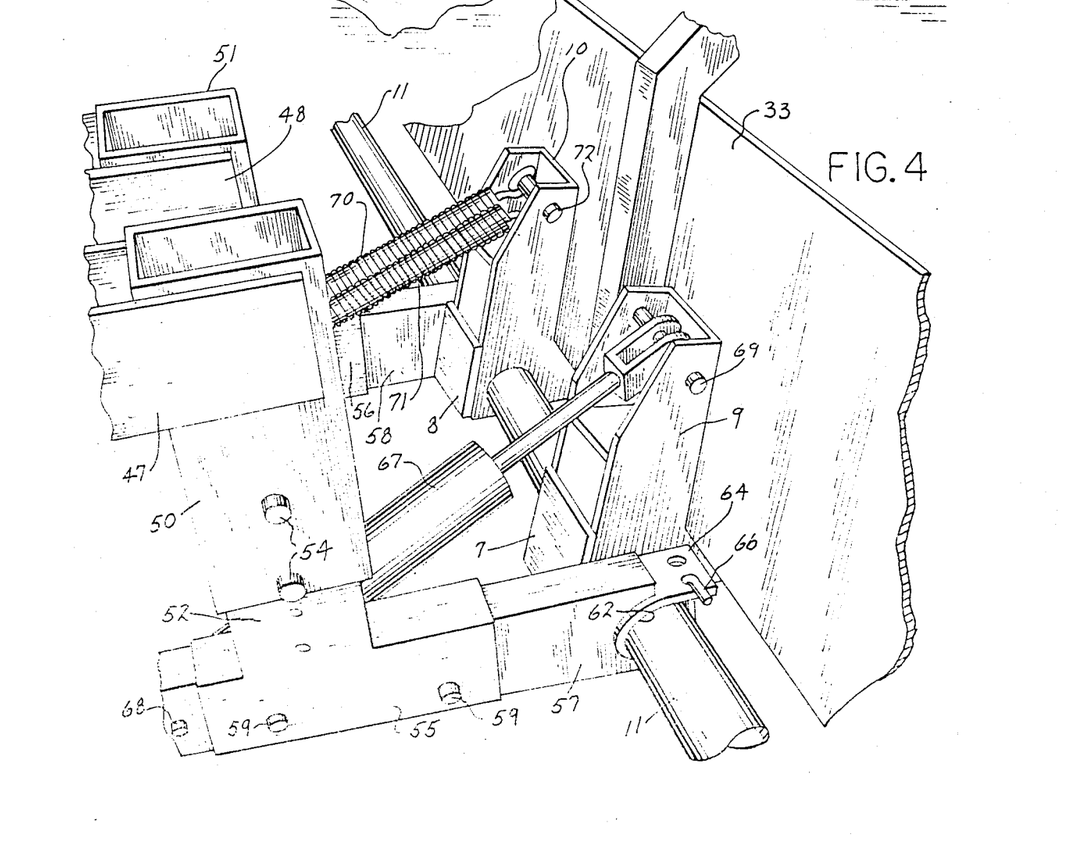
FIG. 4 is a fragmentary perspective view of the mounting arrangement for the windrow merger.
Figure 5:
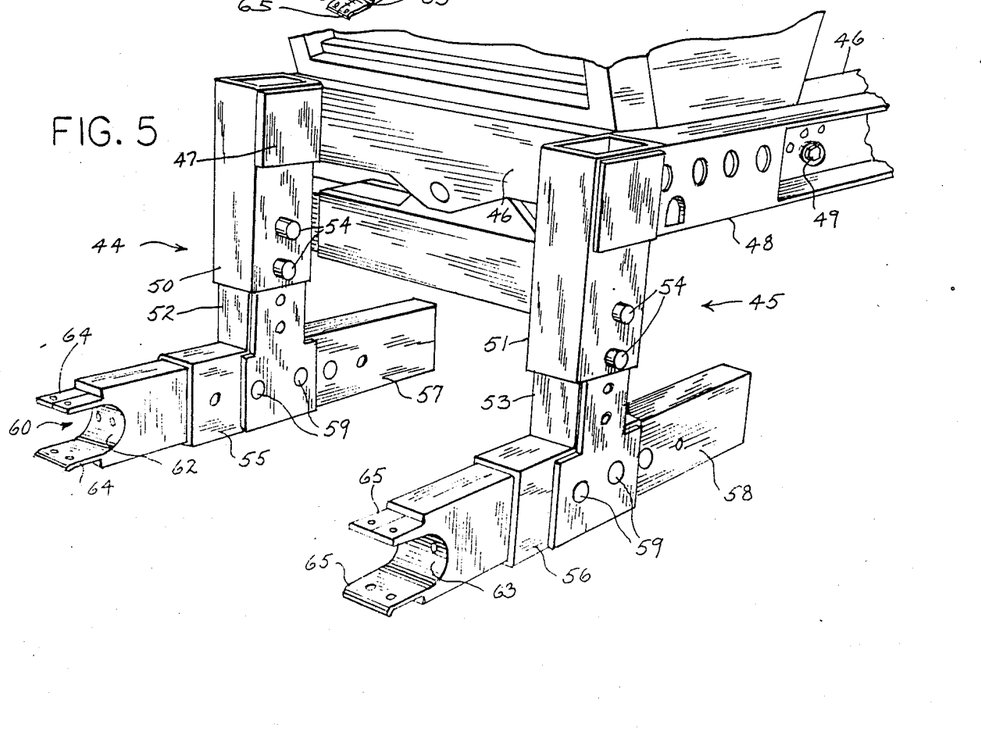
FIG. 5 is a fragmentary perspective view of the bracket assembly for mounting the windrow merger on a tractor.
Figure 6:
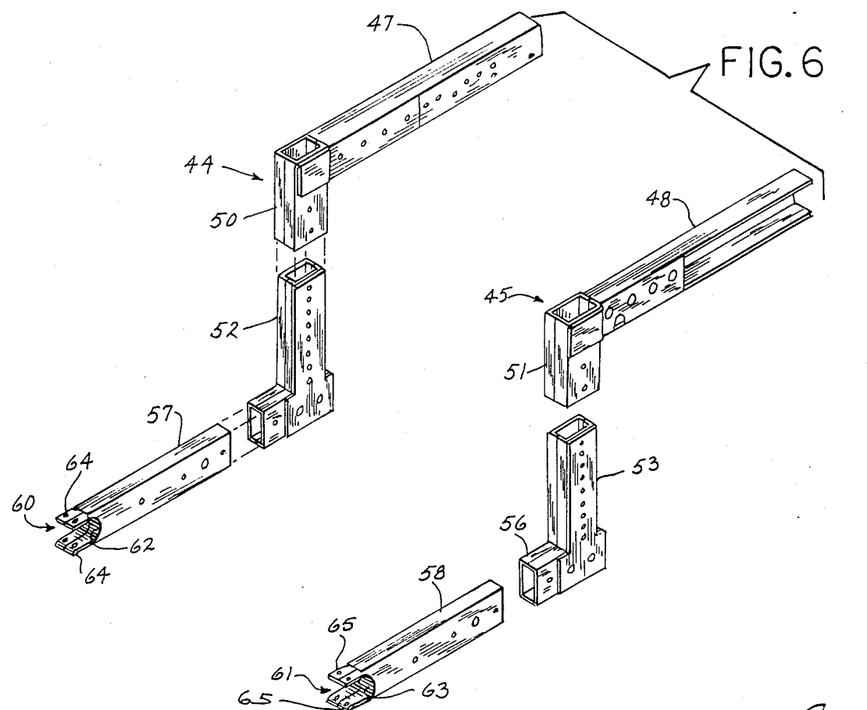
FIG. 6 is an exploded perspective view illustrating the components of the bracket assembly of FIG. 5.

Referring now more specifically to FIGS. 4-6, there is illustrated the assembly for attaching windrow merger 2 to the front end of tractor 1. As shown best in FIGS. 5 and 6, the attachment assembly includes a pair of tractor brackets 44, 45 which are affixed to main frame 46 of tractor 1. Each tractor bracket 44, 45 is identical in structure with each including a main horizontal support member 47, 48 which is mounted to main frame 46 of tractor 1 by means of one or more bolts 49. Main horizontal supports 47, 48 are each in the form of an angle member and includes a vertically extending hollow channel member 50, 51 respectively at its forward end. Channel members 50, 51 are dimensioned to slidably receive a vertical support member 52, 53 respectively. Vertical supports 52, 53 may be adjusted vertically within channel members 50, 51 and fixed at the appropriate desired height by means of pins or bolts 54 extending through aligned openings in channel members 50, 51 and vertical supports 52, 53. Vertical supports 52, 53 also include hollow horizontally extending channel members 55, 56 respectively integrally formed thereon at their lower ends. Channel members 55, 56 are both dimensioned to slidably receive a horizontal support member 57, 58 respectively. Horizontal supports 57, 58 are each slidable within channel members 55, 56 so as to adjust the length each extends forwardly from vertical supports 52, 53. Horizontal supports 57, 58 may be affixed to channel members 55, 56 by means of pins or bolts 59 passing through aligned openings in channel members 55, 56 and horizontal supports 57, 58. The forward ends of horizontal supports 57, 58 each include a yoke member 60, 61 respectively each having a tube-receiving recess 62, 63 formed therein. Each yoke member 60, 61 includes a pair of opposite legs 64, 65, which, as shown best in FIG. 4, straddle pivot tube 11 when assembled. Each of the legs 64, 65 also include aligned openings formed therethrough for receiving a locking pin 66 therethrough (only one of which is shown in FIG. 4). Pins 66 not only lock pivot tube 11 in yoke members 60, 61, but also provide sufficient play therein to permit pivoting of tube 11 in recesses 62, 63.

As a means for pivoting windrow merger 2 relative to the front end of tractor 1 so as to raise and lower pickup head 15, there is provided a hydraulic lift cylinder 67 (see FIG. 4). Lift cylinder 67 is anchored at its cylinder end by means of pin 68 to horizontal support 57, and at its rod end by a pin 69 extending through upstanding support 9. Thus, when cylinder 67 is extended, pickup head 15 is lowered closer to the ground, and when cylinder 67 is retracted pickup head 15 is raised off of the ground.

The attachment assembly also includes a mechanism for counterbalancing windrow merger 2 so as to bias it toward its raised position. Thus, when the windrow merger 2 is lowered to the field position the spring tension will allow the windrow merger to float along ground contour and not dig into the ground. In order to accomplish this, a pair of coil springs 70, 71 extend between upstanding support 10 and horizontal support 58. As best shown in FIG. 4, the forward ends of springs 70, 71 are attached to support 10 by means of a pin 72 while the rearward ends of springs 70, 71 are anchored to horizontal support 58 by another pin (not shown) in a manner similar to the mounting for the cylinder end lift cylinder 67.

In order to attach windrow merger 2 to tractor 1, an operator first adjusts vertical supports 52, 53 and horizontal supports 57, 58 to determine the proper height clearance location for yoke members 60, 61. Pivot tube 11 height is adjusted to align with yoke member 60, 61 height. Tractor 1 is then driven forward until yoke members 60, 61 slide onto pivot tube 11. Locking pins 66 may then be inserted through legs 64, 65 of yoke members 60, 61. Lift cylinder 67 is then anchored at its cylinder end by pin 68 to horizontal support 57 and windrow merger 2 is raised to its transport position. Then the counterbalance spring assembly 70, 71 is attached to horizontal support 58. The hydraulic hoses (not shown) for cylinder 67, of course, must also have been connected to a hydraulic power source typically found in tractor 1.

Figure 7:
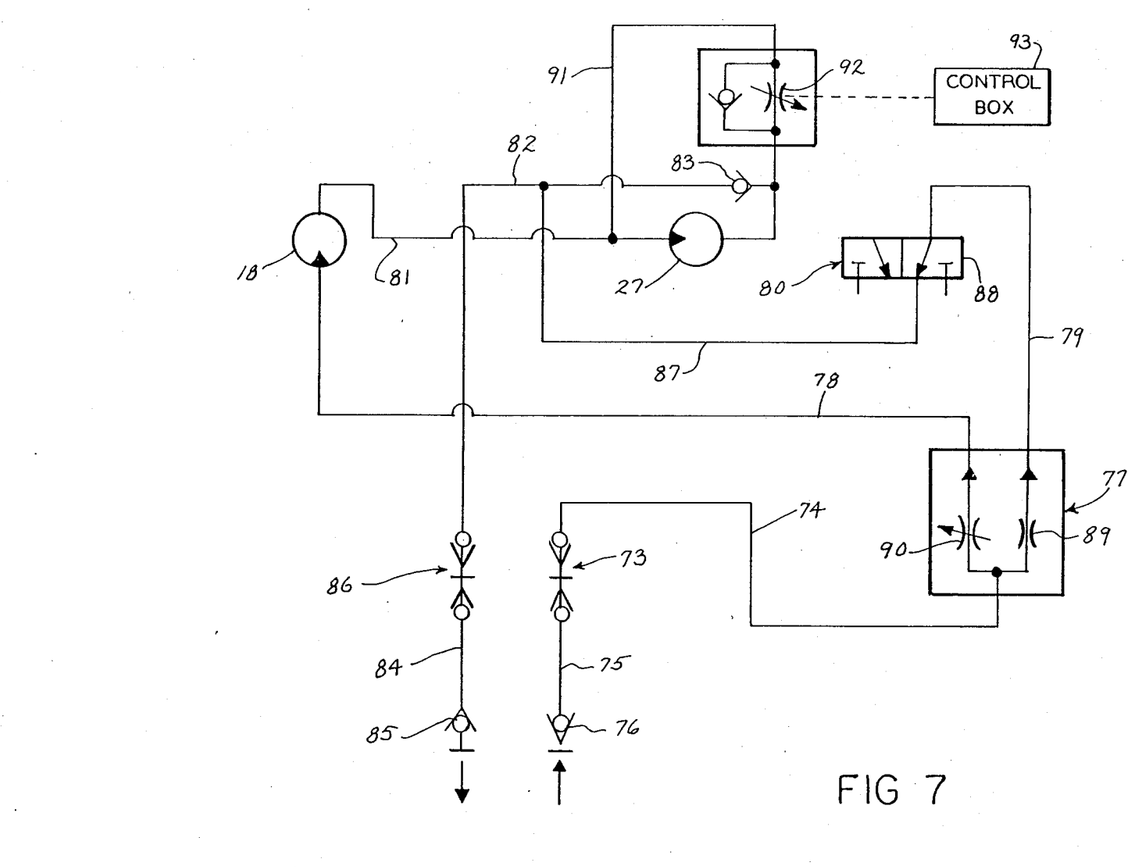
FIG. 7 is a schematic diagram of the hydraulic circuitry for the windrow merger.

Referring now to FIG. 7, there is illustrated a schematic diagram for the hydraulic circuit that operates pickup drive motor 18 and belt drive motor 27. As shown, a quick connect fitting 73 is utilized to connect an input line 74 to a hydraulic line 75 having another quick connect fitting 76 (only half of which is shown in FIG. 7) therein connected to a source of hydraulic fluid in tractor 1. Input line 74 leads to the inlet port of a priority valve 77 having a pair of outlet ports. One outlet port communicates with the inlet port of pickup drive motor 18 and its other outlet port communicates via line 79 to an inlet port of a selector valve 80. The outlet of pickup drive motor 18 communicates via output line 81 to the inlet port of belt drive motor 27, and the outlet port of belt drive motor 27 communicates with a return line 82 which includes a check valve 83 therein. Return line 82 is connected to a hydraulic line 84 by a quick connect fitting 86 which in turn is connected to the tractor source by means of a quick connect fitting 85 (only half of which is shown in FIG. 7).

Selector valve 80 also includes an outlet port communicating via line 87 to return line 82 downstream of check valve 83, and a two position spool element 88 for bypassing the excess flow of hydraulic fluid through selector valve 80. As shown, priority valve 77 includes a first orifice 89 through which fluid flows to selector valve 80, and a variably adjustable orifice 90 through which fluid flows to pickup drive motor 18. As a result, priority valve 77 functions as a flow control means in input line 74 upstream of pickup drive motor 18 for setting the flow of hydraulic fluid to the pickup drive motor 18 from the tractor source at a desired rate. Typically, this rate will be 12 gallons per minute. This is accomplished by means of setting the adjustable orifice 90 of priority valve 77 so as to bleed off a desired amount of fluid from line 74 to return line 82 via line 79 depending upon the flow desired to pickup drive motor 18.

Additionally, the hydraulic circuitry shown in FIG. 7 permits the speed of cross conveyor 23 to be controlled independently of the speed of pickup head 15. This is accomplished by a belt drive motor bypass circuit which includes a bypass line 91 communicating between output line 81 upstream of belt drive motor 27 and return line 82 downstream of belt drive motor 27. A variably adjustable orifice 92 is disposed in bypass line 91 for regulating the flow of hydraulic fluid through line 91. The variable adjustable orifice 92 may be a needle valve or other type of flow control valve which may be manually controlled by the tractor operator. However, orifice 92 may also be operable remotely by means of a control box 93 located in the cab of tractor 1. Thus, by decreasing the flow of fluid in bypass line 91 belt drive motor 27 drives belt 24 faster so as to discharge or "throw" windrow 3 a further distance. In turn, by increasing the flow of hydraulic fluid in line 91 the speed of belt drive motor 27 is decreased and consequently belt 24 discharges or "throws" windrow 3 a shorter distance. This function permits windrow merger 2 to be adaptable to different windrow center distances by adjusting the speed of belt 24 in the appropriate manner.

Various modes of carrying out the invention are contemplated as being within the scope of the following claims particularly pointing out and distinctly claiming the subject matter regarded as the invention.

We claim:

1. An apparatus for merging a pair of windrows into a single windrow for subsequent processing by a forage harvester, square baler or the like, comprising:
    a main frame having forward and rearward ends;
    pickup means at the forward end of said main frame for picking up a first windrow and moving said first windrow rearwardly thereof;
    cross conveyor means mounted on said main frame and disposed rearwardly of said pickup means for transporting said first windrow transversely between a window receiving end and a windrow discharge end;
    drive means for driving said cross conveyor means and said pickup means at predetermined speeds; comprising a hydraulic drive circuit including a hydraulic pickup drive motor and a hydraulic belt drive motor, said pickup drive motor and said belt drive motor being connected in series with a line extending from the outlet of the first of said motors to the inlet of the second of said motors, a source of hydraulic pressure, an input line from said source to the first of said motors, a return line from the second of said motors to said source, and flow control means in said input line upstream of the first of said motors for setting the flow of hydraulic fluid the said motor from said source at a desired rate;
    speed control means for controlling the speed of said cross conveyor independently of the speed of said pickup means, comprising variable flow diversion means interposed between said pickup drive motor and said belt drive motor and in communication with the line extending therebetween; and
    attachment means for pivotally and releasably attaching said main frame to a tractor.

2. The apparatus of claim 1 wherein said main frame includes a pair of laterally spaced forwardly projecting arm assemblies, and said pickup means comprises a pickup head including a rotary shaft extending transversely of said first windrow and having a plurality of axially spaced radially outwardly projecting pickup fingers mounted on said shaft for rotation therewith.

3. The apparatus of claim 1 wherein said cross conveyor means comprises an endless belt.

4. The apparatus of claim 1 wherein said flow control means comprises a priority valve having an inlet port communicating with said source and first and second outlet ports, said first outlet port communicating with the first of said motors, and a selector valve having an inlet port communicating with the second outlet port of said priority valve, an outlet port communicating with said return line, and a two position selector valve spool element movable between an open position that allows excess hydraulic fluid to bypass to return on that with open center hydraulics and a closed position that stops excess flow for closed center tractor systems.

5. The apparatus of claim 1 wherein said variable flow diversion means comprises a bypass circuit which includes a bypass line communicating between said line extending between said pickup drive motor and said drive motor upstream of the second of said motors and said return line downstream of the second of said motors, and a variable adjustable orifice member disposed in said bypass line for regulating the flow of hydraulic fluid therethrough.

6. The apparatus of claim 5 wherein said orifice member comprises a flow control valve.

7. An apparatus for merging a pair of windrows into a single windrow for subsequent processing by a forage harvester, square baler or the like, comprising:
    a main frame having forward and rearward ends;
    pickup means at the forward end of said main frame for picking up a first windrow and moving said first windrow rearwardly thereof;
    cross conveyor means mounted on said main frame and disposed rearwardly of said pickup means for transporting said first windrow transversely between a window receiving end and a windrow discharge end;
    drive means for driving said cross conveyor means and said pickup means at predetermined speeds;
    speed control means for controlling the speed of said cross conveyor independently of the speed of said pickup means; and
    attachment means for pivotally and releasably attaching said main frame to a tractor, comprising a pivot tube extending transversely on said main frame rearwardly of said cross conveyor means, bracket means mounted on the tractor including a tube-receiving passage, independently operable lock means cooperable with the tube-receiving passage of said bracket means for locking said tube within said tube-receiving passage and for permitting pivotal movement of said tube relative to said bracket means, and lift means for pivotally moving said main frame relative to said bracket means to raise and lower said main frame.

8. The apparatus of claim 7 wherein said bracket means includes a yoke member which includes opposite legs defining said tube-receiving passage, and said lock means comprises a pin extending between said legs.

9. The apparatus of claim 7 wherein said lift means extends between said bracket means and one of said arm assemblies.

10. The apparatus of claim 9 wherein said lift means comprises a hydraulic cylinder.

11. The apparatus of claim 7 wherein said attachment means further includes counterbalance means for biasing said main frame toward its raised position.

12. The apparatus of claim 11 wherein said counterbalance means comprises spring means extending between one of said arm assemblies and said bracket means.

13. The apparatus of claim 12 wherein said spring means comprises at least one coil spring.

14. The apparatus of claim 1 further including a shroud mounted on said main frame rearwardly of said conveyor means and extending upwardly and forwardly over said conveyor means, said shroud being open at its forward end and at the discharge end of said conveyor means and closed at the receiving end of said conveyor means.

15. The apparatus of claim 14 wherein said shroud includes a vertical deflector disposed rearwardly of said conveyor means, a horizontal deflector disposed above said conveyor means, and an angle deflector interconnecting said vertical and horizontal deflectors.

16. The apparatus of claim 14 further including a transparent window formed in said angle deflector at the receiving end of said conveyor means.

17. The apparatus of claim 14 further including a windrow holddown means mounted on the forward end of said shroud for holding said first windrow against said pickup head.

18. The apparatus of claim 17 wherein said holddown means comprises a plurality of transversely spaced arcuate shaped tines pivotally mounted on said shroud between an upper storage position and a lower guide position.

19. The apparatus of claim 18 wherein the pivotal connection of said tines is provided by a rod pivotally mounted at its opposite ends to a pair of holddown supports depending from the forward end of said shroud.

20. The apparatus of claim 7 wherein said main frame includes a pair of laterally spaced forwardly projecting arm assemblies, and said pickup means comprises a pickup head including a rotary shaft extending transversely of said first windrow and having a plurality of axially spaced radially outwardly projecting pickup fingers mounted on said shaft for rotation therewith.

* * * * *

UNITED STATES PATENT AND TRADEMARK OFFICE
CERTIFICATE OF CORRECTION

PATENT NO. : 4,910,951

DATED : March 27, 1990

INVENTOR(S) : Reilly et al.

It is certified that error appears in the above-identified patent and that said Letters Patent is hereby corrected as shown below:

Claim 1, Col. 7, Lines 53 and 54, after "between a" delete "window" and substitute therefor --- windrow ---;

Claim 1, Col. 8, Line 1, delete "the" and substitute therefor --- to ---;

Claim 4, Col. 8, Line 29, delete "that" and substitute therefor --- tractors ---;

Claim 5, Col. 8, Line 36, before "drive" insert --- belt ---;

Claim 7, Col. 8, Lines 52 and 53, after "between a" delete "window" and substitute therefor --- windrow ---.

Signed and Sealed this

Fourteenth Day of May, 1991

Attest:

HARRY F. MANBECK, JR.

*Attesting Officer*     *Commissioner of Patents and Trademarks*